Patented Mar. 2, 1954

2,671,107

UNITED STATES PATENT OFFICE 2,671,107

CATALYTIC DEHYDROGENATION OF ALIPHATIC NITRILES

La Vern H. Beckberger, Markham, Ill., assignor to Sinclair Refining Company, New York, N. Y., a corporation of Maine No Drawing. Application June 26, 1951, Serial No. 233,687

3 Claims. (Cl. 260—465.9)

My invention relates to the catalytic dehydrogenation of aliphatic nitriles. More particularly, my invention is directed to the production of unsaturated nitriles by the catalytic dehydrogenation of aliphatic nitriles containing the same number of carbon atoms.

The dehydrogenation of aliphatic nitriles proceeds according to the primary reaction $$R\text{—}CN \rightarrow R'\text{—}CN + H_2$$

wherein R represents an aliphatic radical and R' is a corresponding unsaturated radical. R represents radicals such as ethyl, propyl, isopropyl, butyl, crotyl, amyl, octyl, lauryl, cetyl and other aliphatic straight and branch chained radicals susceptible to dehydrogenation of a saturated pair of adjacent carbon atoms.

The dehydrogenation reaction is carried out in the vapor phase at elevated temperatures of the order of 1150° F., at low pressures of the order of 1 atmosphere, and in the presence of catalysts. Under such conditions the equilibrium is favorable to production of the unsaturated nitrile but reaction equilibrium is not approached. Many competing primary reactions and secondary reactions also take place causing the formation of large quantities of lower saturated nitriles, HCN, NH4CN, gaseous olefins and paraffins, carbonaceous deposits, and, to some extent, polymerized products. Thus, in effecting the dehydrogenation reaction, there is a permanent and undesirable loss of reactant reducing the ultimate yield of the desired product.

My invention has as its principal object to improve the yield of the desired unsaturated nitrile but also accomplishes a significant reduction in the ratio of gaseous olefin and paraffin products to hydrogen product, and effectively suppresses the formation of hydrogen cyanide gas.

I have discovered that these ends may be attained by adding hydrogen cyanide gas to the nitrile feed before introducing the feed to the reaction catalyst. I prefer to employ a molar ratio of HCN:nitrile of approximately 2:1. However, ratios as low as 1:10 are effective and there is no upper limit on the mole ratio of HCN to nitrile other than is dictated by practical considerations. One convenient method for accomplishing the purpose of my invention includes preparing a feed mixture of aliphatic nitrile and hydrogen cyanide which is subjected to dehydrogenation conditions. The reaction effluent is readily fractionated and the hydrogen cyanide and unreacted nitrile recovered may be recycled with the feed mixture.

Many suitable catalysts have been prepared and utilized successfully in the dehydrogenation of nitriles. None however is capable of effecting complete conversion to equilibrium conditions even upon unduly protracted contact between the nitrile and catalyst. Many of the catalysts successfully utilized, i. e. chromia-alumina, show extremely high rates of conversion, but are equally effective in promoting extraneous competing side reactions and secondary reactions such as cracking, rearrangement, and polymerization. Other catalysts showing similar rates of conversion are more successfully utilized because they are highly selective to the specific reaction. Two such catalysts are amorphous chromium oxide-copper oxide and amorphous chromium oxide supported on pumice. Other useful catalysts are those generally useful in dehydrogenation reactions. Specifically various non-reducible metal oxides such as chromium oxide, alumina, molybdenum oxide, barium oxide, zinc oxide, magnesia and vanadia are useful. These catalysts have been found suitable in pelleted or finely divided form, in mixtures, as single component catalysts, or prepared on inert or active supports. My discovery is not related to nor dependent upon any particular catalyst since the reaction involved is not so limited. However, it is generally necessary that a catalyst be employed as the reaction rates, even at extremely elevated temperatures, are quite slow and economically impractical without the use of a catalyst.

Suitable conversion temperatures are within the range of about 950° to about 1300° F. While equilibrium is theoretically more favorable at higher temperatures, in practice equilibrium is not approached and the sole effect of temperature on the reaction is on rate. So also, while decreased pressures theoretically give a more favorable equilibrium. I have found pressure variations within the range of about 500 mm. Hg to 1500 mm. Hg have little effect on the relative proportions of the reaction effluents and on the reaction rates involved. I generally prefer to operate at nitrile partial pressures between 25 mm. Hg and 250 mm. Hg. I might also point out that high temperatures such as 1300° F. and above, while increasing the reaction rate, have a greater effect on the reaction rates and equilibria of the principal competing primary and secondary reactions. The choice of 1300° F. is rather arbitrary but it constitutes a practical upper limit on temperatures employed. Below about 950° F. the rates are so reduced as to render conversion impractical.

The suitable space velocity, or catalyst to feed ratio, will depend largely upon the nature of the catalyst employed and the manner of its handling. Such choice is a matter of individual preference and is readily variable. I prefer employing nitrile space velocities within the range of about 1.0 to 8 or 10 v./v./hr., calculating the volume of feed as in the liquid phase.

In order to illustrate the practice of my invention I have chosen the dehydrogenation of propionitrile but it will be understood by persons skilled in the art that the illustration is applicable to the dehydrogenation of other aliphatic nitriles having between 4 and 12 or more carbon atoms per molecule. The aliphatic radical may be either branched or straight chained, paraffin or olefin, but must possess saturated carbon to carbon linkages susceptible to dehydrogenation at elevated temperatures in the presence of a dehydrogenation catalyst. Generally, the carbon to carbon bond which is most susceptible to dehydrogenation is that between the second and third carbon atoms from the nitrile nitrogen atom. Propionitrile was chosen since its primary dehydrogenation product, acrylonitrile, is of growing industrial importance being useful in the manufacture of synthetic resins, textiles and rubber, in the manufacture of unsaturated acids, amines, amides and esters by hydrolysis or alcoholysis, and in the synthesis of pharmaceuticals surface coatings, dyes, rubber chemicals and explosives.

*Example*

Amorphous chromium oxide was prepared as a granulated gel as follows:

160 grams of chromic acid ($CrO_3$) was dissolved in 2000 cc. of water. Eight 10 cc. portions of ethyl alcohol were added to this solution at 5 minute intervals with frequent shaking of the solution. The solution was allowed to stand for 4 hours and then 80 cc. more alcohol were added in the same manner as before. The solution was then refluxed with mechanical agitation for a period of about 15 or 16 hours after which the resulting mixture was allowed to cool forming a chocolate brown precipitate. The precipitate was filtered from the mother liquor and the filter cake was broken up and partially dried at 60° C. under conditions of high humidity, finally raising the temperature to 105° C. The resulting particles were black and vitreous. Analysis established that approximately 17.5% of the total chromium in the dried amorphous catalyst so prepared was present as hexavalent chromium, the balance representing trivalent chromium.

A portion of the catalyst, having a particle size of 8-14 mesh, was placed in a reactor. Propionitrile which analyzed:

| | Weight per cent |
|---|---|
| Acetonitrile | 0.29 |
| Propionitrile | 96.6 |
| Isobutyronitrile | 3.1 | was blended with the hydrogen cyanide in a ratio of two moles of hydrogen cyanide to one mole of the nitrile, calculated as propionitrile. The blend was heated to 1150° F. under atmospheric pressure of 750 mm. Hg and was charged to the reactor containing the chromium gel catalyst at a space velocity of 1.0 calculated on the propionitrile feed.

The identical procedure was repeated twice using fresh portions of catalyst from the same batch and three additional runs were made, again employing the same propionitrile space velocity and partial pressure, and employing each time fresh charges of the catalyst but omitting the hydrogen cyanide in the feed.

The runs employing the hydrogen cyanide in the feed exhibited no production of hydrogen cyanide gas, no more HCN being recovered in the reaction effluent than was charged in the feed. The runs charged with a nitrile feed only, however, exhibited a HCN production of about 40 mole per cent based on the production of acrylonitrile, thus representing a permanent loss of nitrile reactant of a high order.

Again, the runs employing the hydrogen cyanide-nitrile feed produced acrylonitrile, on the basis of the propionitrile feed, equivalent to that produced when no hydrogen cyanide was employed in the feed, but utilized 15 to 20 per cent by weight less propionitrile. That is, the ratio of acrylonitrile to propionitrile reacted, when the feed contained hydrogen cyanide, was about 120 per cent of the same ratio when the nitrile feed was employed without hydrogen cyanide. Thus the process of my invention represents a more efficient utilization of propionitrile reactant which in commercial practice will result in considerable savings and economy.

Moreover, the runs made according to my invention substantially suppressed the production of normally gaseous olefin and paraffin products such as methane, ethane, ethylene, and propylene. The molar ratio in the reaction effluent of hydrogen gas to hydrocarbon gases was substantially greater than 7 when the process employed hydrogen cyanide-nitrile feed, but was less than 4 when only nitriles were present in the feed. Again a clear indication is had that the process of my invention effectively suppresses competing reactions which represent loss of reactant in unrecoverable form.

I claim:

1. In the catalytic dehydrogenation of aliphatic nitriles to produce corresponding unsaturated nitriles by contacting an aliphatic nitrile with a solid dehydrogenation catalyst in a reaction zone at a temperature within the range of about 950° F. to about 1300° F. and recovering the unsaturated nitrile product from the reaction effluent, the improvement which comprises mixing a material consisting essentially of hydrogen cyanide with the aliphatic nitrile feed, the molar ratio of hydrogen cyanide to nitrile being at least 1:10.

2. In the catalytic dehydrogenation of propionitrile to produce acrylonitrile by contacting propionitrile with a solid dehydrogenation catalyst in a reaction zone at a temperature within the range of about 950° F. to about 1300° F. and recovering the acrylonitrile product from the reaction effluent, the improvement which comprises mixing a material consisting essentially of hydrogen cyanide with the propionitrile feed, the molar ratio of hydrogen cyanide to propionitrile being at least 1:10.

3. A process for the production of acrylonitrile according to claim 2, in which hydrogen cyanide and unreacted propionitrile are recovered from the reaction effluent and recycled in the feed.

LA VERN H. BECKBERGER.

References Cited in the file of this patent

UNITED STATES PATENTS

| Number | Name | Date |
|---|---|---|
| 2,452,505 | Teter | Oct. 26, 1948 |
| 2,554,484 | Loder | May 29, 1951 |

FOREIGN PATENTS

| Number | Country | Date |
|---|---|---|
| 790,262 | France | Nov. 16, 1935 |